United States Patent [19]

Rinehart

[11] Patent Number: 4,511,522

[45] Date of Patent: * Apr. 16, 1985

[54] METHOD OF MAKING A COMPOSITE FOAM TAXIDERMY MANNIKIN INVOLVING THE USE OF A CLEANABLE ADHESIVE TO HOLD THE ARTIFICIAL EYES IN THE MOLD CAVITY

[76] Inventor: John R. Rinehart, 3232 McCormick Dr., Janesville, Wis. 53545

[*] Notice: The portion of the term of this patent subsequent to Oct. 16, 2001 has been disclaimed.

[21] Appl. No.: 572,808

[22] Filed: Jan. 23, 1984

Related U.S. Application Data

[63] Continuation of Ser. No. 363,263, Mar. 29, 1982, Pat. No. 4,432,919.

[51] Int. Cl.³ .............................................. B29D 27/04
[52] U.S. Cl. .................................. 264/46.4; 264/46.9; 264/271.1; 264/275
[58] Field of Search .................... 264/46.4, 46.9, 271.1, 264/275

[56] References Cited

U.S. PATENT DOCUMENTS

| | | |
|---|---|---|
| 3,106,040 | 10/1963 | Ostrander . |
| 3,112,163 | 11/1963 | Alderfer . |
| 3,432,581 | 3/1969 | Rosen . |
| 4,083,916 | 4/1978 | Chasse ............................ 264/275 X |
| 4,288,903 | 9/1981 | Matsuda et al. . |
| 4,432,919 | 2/1984 | Rinehart . |

*Primary Examiner*—Philip Anderson
*Attorney, Agent, or Firm*—Isaksen, Lathrop, Esch, Hart & Clark

[57] ABSTRACT

Disclosed is a taxidermy mannikin mold and molding method for making a mannikin which has eyes insert-molded therein in proper position and rotational orientation and which has proper eye-surrounding anatomical surface features. The mold cavity has therein eye socket recesses each of which is immediately surrounded by a correctly contoured surface having reference indicia marking.

4 Claims, 8 Drawing Figures

METHOD OF MAKING A COMPOSITE FOAM TAXIDERMY MANNIKIN INVOLVING THE USE OF A CLEANABLE ADHESIVE TO HOLD THE ARTIFICIAL EYES IN THE MOLD CAVITY

CROSS-REFERENCE TO RELATED APPLICATION

This application is a continuation of application Ser. No. 363,263, filed Mar. 29, 1982 and now U.S. Pat. No. 4,432,919.

BACKGROUND OF THE INVENTION

Taxidermists mount animal head skins over molded animal head mannikins, such as deer head mannikins, and secure the result to a wall plaque or the like for use as a trophy.

Currently, these molded mannikins, usually of light-weight polyurethane foam material, do not have artificial eyes attached thereto. These mannikins have very large eye socket cavities into each of which the taxidermist must: mount centrally therein the artificial eye; make and mount eye-surrounding anatomy contour features, usually of modeling clay; and, if the eye is of the elongated pupil type, such as with deer, rotate the eye to a proper orientation for correct and natural appearance. The positioning and securing of the eye in correct position, and the forming of the correct eye-surrounding anatomical contour features, is demanding of considerable time and skill.

This invention provides a mold and molding method for making a molded animal head mannikin which has the eyes insert-molded therein in correct position and rotational orientation and has correct eye-surrounding anatomy features, all as an integral part of the molded mannikin.

SUMMARY OF THE INVENTION

A summary description is set forth in the Abstract of the Disclosure and reference is to be had thereto.

An object of the invention is to provide a mold and molding method for producing taxidermy animal head mannikins with the eyes and the eye-surrounding anatomy as part of the mannikin when it comes out of the mold, so that the taxidermist need not spend time and skill positioning or mounting the eyes, or filling in and contouring around the eyes to provide correct anatomical eye-surrounding features.

DETAILED DESCRIPTION OF THE SHOWN EMBODIMENT

Figure 1:
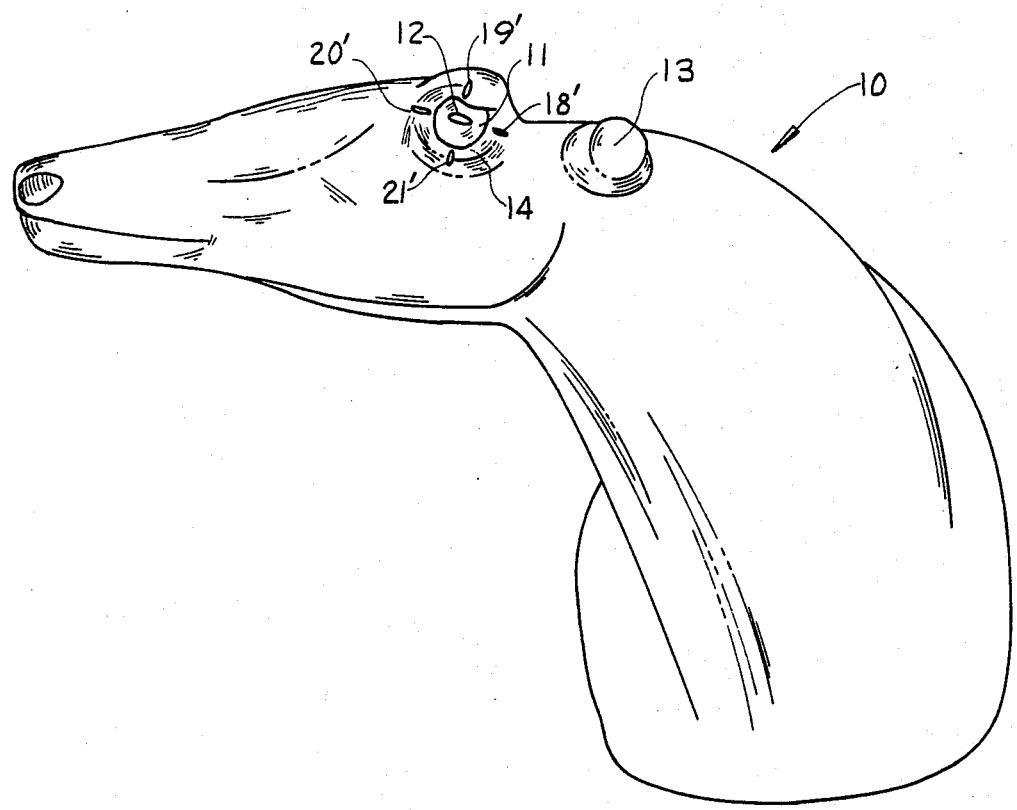
FIG. 1 is a view of a mannikin made in accordance with the invention.

Referring to the drawing, in FIG. 1 there is shown a deer head mannikin 10 molded in accordance with this invention of light-weight polyurethane foam material, having insert-molded therein an artificial eye 11 which has an elongated pupil 12. The mannikin has correct deer head anatomical features including the ear stump indicated at 13 and the eye-surrounding features indicated at 14.

Figure 2:
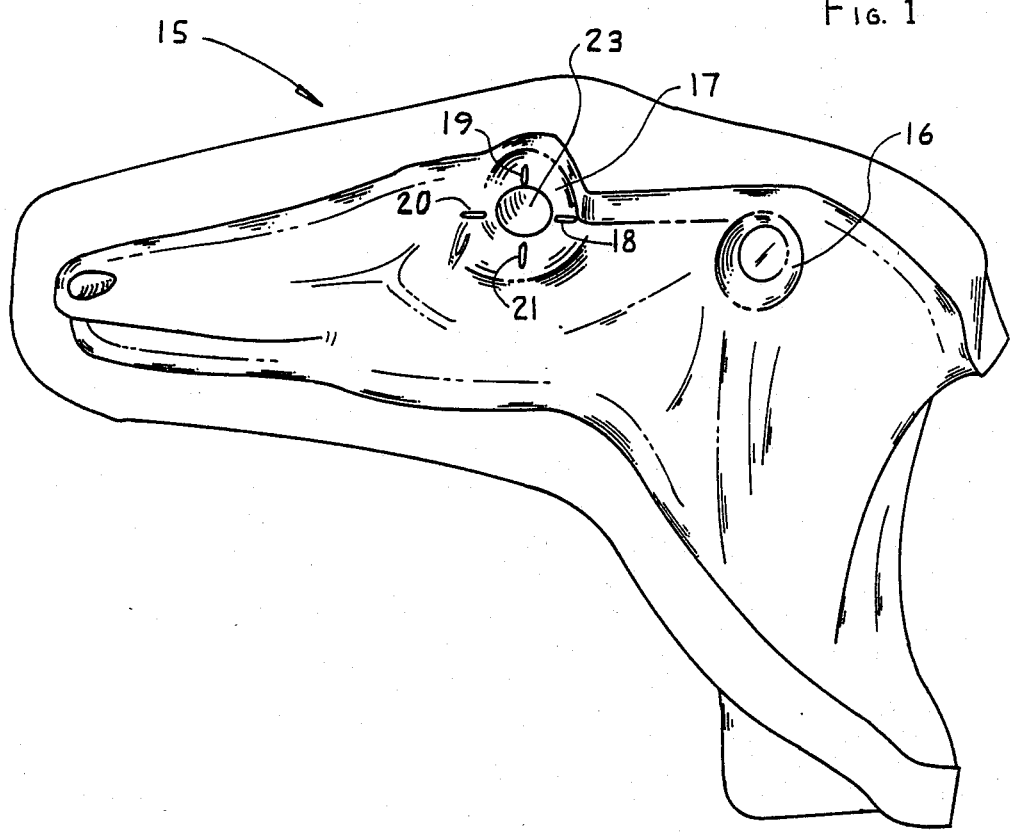
FIG. 2 is a view of the inside of one of the half parts of a mold made in accordance with the invention.
Figure 3:
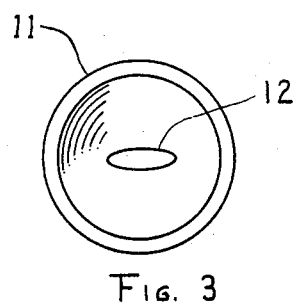
FIG. 3 is a rear elevation view of an artificial eye used in carrying out the invention.
Figure 4:
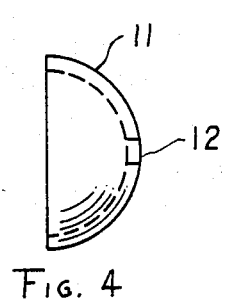
FIG. 4 is a side elevation view of the eye.
Figure 5:
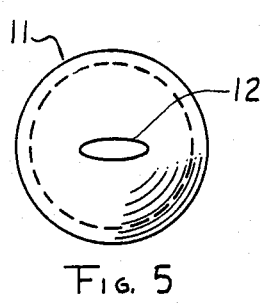
FIG. 5 is a front elevation view thereof.
Figure 6:
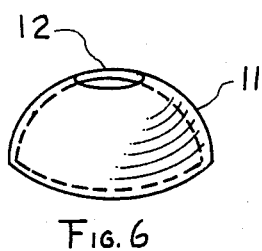
FIG. 6 is a perspective view thereof.

In FIG. 2 there is shown the right side half part 15 of a mold for forming the mannikin 10, the part 15 having an ear stump recess 16 in the cavity surface thereof and a semi-spherical eye socket recess 23 in said surface. The cavity surface is contoured to correctly form all features of the mannikin including the features immediately surrounding the eye, and, accordingly, the cavity surface is so contoured as indicated at 17 in FIG. 2 to provide the correct features indicated as 14 in FIG. 1. In the eye socket surrounding area 17 of the mold part there are ridges 18, 19, 20 and 21 which serve as indicia markings to facilitate properly positioning the eye in the eye socket recess. These ridges 18, 19, 20 and 21 produce, in the molding process, groves 18', 19', 20' and 21' on the mannikin as shown in FIG. 1.

FIGS. 3, 4, 5 and 6 show an artificial deer eye 11 having an elongated pupil 12. The eye is of glass or plastic and is a semi-spherical shell having its concavity in the rear side thereof.

Figure 7:
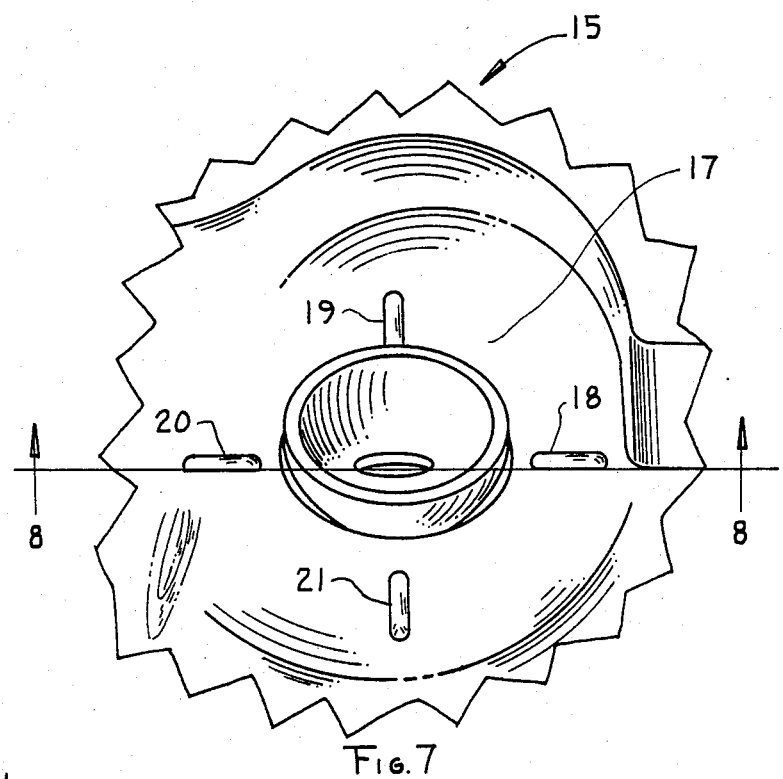
FIG. 7 is an enlarged view of a portion of the mold shown in FIG. 2, but showing the artificial eye inserted therein in proper position.

FIG. 7 shows an eye placed in the eye socket recess, in proper rotational orientation, with the elongated pupil's long axis aligned with ridges 18 and 20. The ridges 18, 19, 20 and 21 are shown equidistantly spaced about the perimetrical edge of the eye socket recess, with ridges 18 and 20 aligned with the long axis of the elongated pupil of the eye, and ridges 19 and 21 aligned with the short axis of that pupil.

Figure 8:
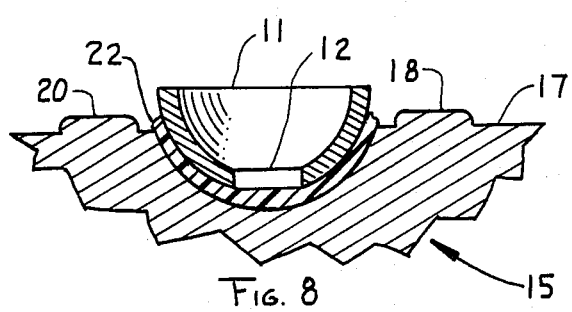
FIG. 8 is a section view taken on line 8—8 of FIG. 7.

FIG. 8 shows eye 11 inserted into the eye socket recess with eye 11 rotationally oriented so that elongated pupil 12 is aligned with ridges 18 and 20, and with eye 11 held in the recess by an adhesive 22, which adhesive may be removed from the front of the eye after removing the molded mannikin from the mold.

It will be appreciated that the invention is carried out by providing in each of two half mold cavity parts a small eye socket recess to snugly receive the front portion of the artificial eye, leaving the rear portion thereof projecting into the mold cavity, and by providing in each mold cavity part a correct sculpted or contoured surface of anatomical features immediately around the small eye socket recess right up to the edge thereof, and by providing, in that eye socket recess surrounding area, reference indicia marking to facilitate correct rotational positioning of the eye in the eye socket recess for correct directional orientation of the long axis of the elongated pupil of the eye. When inserting the eye into the eye socket recess and rotationally positioning it therein, one may use a removable (cleanable) adhesive which will hold the eye correctly during the molding operation, and which will be removable (cleanable) from the front of the eye after the molding operation. With eyes inserted into, properly positioned and held in each of the half mold parts, the half parts are then closed together to form the full mold; and the mannikin is then molded by pouring into the mold cavity a liquid polyurethane foaming material, allowing it to foam expand and harden. The material surrounds the rear portion of the eyes and enters the concavities thereof so as to lock the eyes securely in the mannikin. When the two half parts of the mold are separated, the resulting mannikin coming out of the mold has the eyes properly positioned in all respects, rotationally and otherwise, and has correct eye-surrounding anatomical features.

The taxidermist using mannikins produced in accordance with this invention may proceed to mount the animal skin over the mannikin, mounting the skin over the properly contoured surface including the eye-surrounding area right up to the perimeter of the eye itself. The taxidermist need not do anything to position the eye, and need not build up the eye-surrounding surface to properly back up the skin.

What is claimed is:

1. A method of making a taxidermy animal head mannikin having artificial eyes with pupils properly positioned therein and surrounded immediately by proper anatomical features, comprising:

providing a mold comprising half parts which together define a cavity surface contoured for correct anatomical formation of features of the mannikin including the features immediately surrounding the eye; and two eye socket recesses in the cavity surface for snugly receiving the front portion of the eyes;

inserting into each eye socket recess of the mold the front portion of an artificial eye having a pupil with cleanable adhesive emplaced between the socket recess and the front portion of the eye, leaving the rear portion of the eye projecting into the mold cavity;

orienting each eye as held by the adhesive to a desired position;

closing the half parts together to form the full mold cavity therebetween; and introducing liquid foamable hardenable material into the mold cavity to foam expand and harden, thereby forming the mannikin and locking the eyes into the mannikin in proper position therein;

separating the two half parts of the mold from the formed mannikin; and cleaning the adhesive from the eyes embedded in the mannikin.

2. A method of making a taxidermy animal head mannikin having artificial eyes with pupils properly positioned therein and surrounded immediately by proper anatomical features, comprising:

providing a mold comprising half parts which together define a cavity surface contoured for correct anatomical formation of features of the mannikin including the features immediately surrounding the eye; two semi-spherical eye socket recesses in the cavity surface for snugly receiving the front portion of the eyes; and reference indicia on the cavity surface near the edges of the eye socket recesses;

inserting into each eye socket recess of the mold the front portion of an artificial eye having a pupil with cleanable adhesive emplaced between the socket recess and the front portion of the eye, leaving the rear portion of the eye projecting into the mold cavity;

orienting the pupil of each eye with respect to the reference indicia;

closing the half parts together to form the fold mold cavity therebetween; and introducing liquid foamable hardenable material into the mold cavity to foam expand and harden, thereby forming the mannikin and locking the eyes into the mannikin in proper position therein.

3. The method of claim 2 including the steps of:

separating the two half parts of the mold from the formed mannikin; and cleaning the adhesive from the eyes embedded in the mannikin.

4. The method of claim 2 wherein four reference indicia ridges are equally spaced about each eye socket recess.

* * * * *

UNITED STATES PATENT AND TRADEMARK OFFICE
CERTIFICATE OF CORRECTION

PATENT NO. : 4,511,522

DATED : April 16, 1985

INVENTOR(S) : John R. Rinehart

It is certified that error appears in the above–identified patent and that said Letters Patent are hereby corrected as shown below:

On the first page of the patent, in the paragraph entitled "Notice": Delete "The portion of the term of this patent subsequent to Oct. 16, 2001 has been disclaimed." and insert in its place--The portion of the term of this patent subsequent to Feb. 21, 2001 has been disclaimed.--.

Signed and Sealed this

Twenty-fourth Day of December 1985

[SEAL]

Attest:

DONALD J. QUIGG

*Attesting Officer*     *Commissioner of Patents and Trademarks*

UNITED STATES PATENT AND TRADEMARK OFFICE
CERTIFICATE OF CORRECTION

PATENT NO. : 4,511,522
DATED : April 16, 1985
INVENTOR(S) : John R. Rinehart

It is certified that error appears in the above-identified patent and that said Letters Patent are hereby corrected as shown below:

Claim 2, column 4, line 24, "fold" should read --full--.

Signed and Sealed this

Fifteenth Day of July 1986

[SEAL]

Attest:

Attesting Officer

DONALD J. QUIGG

Commissioner of Patents and Trademarks